Patented Jan. 16, 1934

1,943,513

UNITED STATES PATENT OFFICE 1,943,513

CHEMICAL COMPOUND

Willi Brün, Bridgeport, Conn., assignor to Remington Arms Company, Inc., a corporation of Delaware No Drawing. Application October 19, 1931
Serial No. 569,838

13 Claims. (Cl. 52—4)

This invention relates to certain new chemical compounds of a somewhat explosive nature, to the preparation of such compounds, and to their use either alone or in conjunction with other substances as explosive compositions, particularly as compositions for use as ammunition priming mixtures.

The compounds are derivatives of ortho cresol, particularly lead salts of 3–5 di-nitro ortho cresol. Two such lead salts have been discovered, and their analyses indicate compositions corresponding respectively to mono-basic lead 3–5 di-nitro cresylate and di-basic lead 3–5 di-nitro cresylate.

The mono-basic salt is prepared as follows: A solution of 1.98 grams of 3–5 di-nitro ortho cresol and .8 grams of sodium hydroxide in 100 c. c. of water is dropped into a solution of 3.5 grams of lead nitrate in 100 c. c. of water, at a temperature between 70° and 80° C. The precipitate, which is of a light yellow color and of fluffy character, is filtered off and washed with water. It has a lead content of 48.84%, corresponding substantially to the theoretical lead content, 49.19%, of mono-basic lead 3–5 di-nitro ortho cresylate having the structural formula

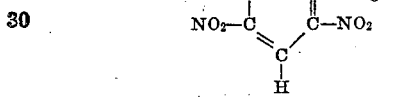

The di-basic salt is prepared as follows: A solution of 1.98 grams of 3–5 di-nitro ortho cresol and 1.2 grams of sodium hydroxide in 100 c. c. of water is dropped slowly into a solution of 10.5 grams of lead nitrate in 100 c. c. of water, at a temperature between 80° and 90° C. After cooling, the precipitate is filtered off, washed and dried. Said precipitate is in the form of brownish rhombic crystals. It will be noted that the quantity of lead nitrate is an excess of about 100% over the theoretically re-acting quantity. It is necessary to use such an excess of lead nitrate in order to secure a crystalline precipitate. The use of the theoretical quantity results in an amorphous yellow precipitate only. The precipitated compound is found upon analysis to have a lead content of 57.35% which is almost identical with the theoretical lead content, 57.36%, of di-basic lead 3–5 di-nitro ortho cresylate of the formula

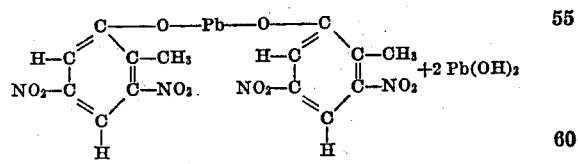

Both of these salts have been found useful as priming mixture ingredients, particularly priming mixture fuels. The di-basic salt, however, is preferred for this purpose on account of its greater density and crystalline character. The semi-explosive character of either salt adds to its value as a priming mixture fuel, since mixtures containing such semi-explosive fuels tend to be more sensitive to percussion than mixtures utilizing only inert substances as fuels.

Typical priming mixtures are included in the following table:

| | |
|---|---|
| Mercury fulminate | 30% to 50% |
| Barium nitrate | 20% to 40% |
| Mono-basic or di-basic lead 3–5 di-nitro ortho cresylate | 5% to 15% |
| Abrasive | substantially 20% |

This formula, however, is merely typical. The explosive, mercury fulminate, may be replaced wholly or in part by a nitro organic compound, such as a lead salt of styphnic acid, or such a salt in admixture with guanylnitrosaminoguanyltetracene, lead methylene di-iso nitro amine, diazo-di-nitro phenol, a lead salt of picric acid, and similar explosive bodies. Suitable non-corrosive oxidizers include other nitrates, such as normal or basic lead nitrate, chromates, permanganates, oxides and peroxides. Other fuels, such as lead sulphocyanate, antimony sulphide and/or calcium silicide, may likewise be used in conjunction with the lead salts of 3–5 di-nitro ortho cresol. The said lead salts being themselves novel, the appended claims are to be broadly construed.

What is claimed is:

1. As a composition of matter, a lead salt of 3–5 di-nitro ortho cresol.

2. As a composition of matter, a basic lead salt of 3–5 di-nitro ortho cresol.

3. As a composition of matter, mono-basic lead 3-5 di-nitro ortho cresylate.

4. As a composition of matter, di-basic lead 3-5 di-nitro ortho cresylate.

5. A priming composition containing a lead salt of 3-5 di-nitro ortho cresol.

6. A priming composition containing a basic lead salt of 3-5 di-nitro ortho cresol.

7. A priming composition containing mono-basic lead 3-5 di-nitro ortho cresylate.

8. A priming composition containing di-basic lead 3-5 di-nitro ortho cresylate.

9. A priming composition containing a lead salt of 3-5 di-nitro ortho cresol, a suitable combustion initiator, and a suitable oxidizer.

10. A priming composition containing di-basic lead 3-5 di-nitro ortho cresylate, a suitable combustion initiator, and a suitable oxidizer.

11. The method of making a lead salt of 3-5 di-nitro ortho cresol which comprises the addition to an aqueous solution of lead nitrate of an aqueous solution of sodium hydroxide and 3-5 di-nitro ortho cresol.

12. The method of making mono-basic lead 3-5 di-nitro ortho cresylate which comprises precipitating said salt by the addition to a solution of 3.5 grams of lead nitrate in 100 c. c. of water of a solution of 1.98 grams of 3-5 di-nitro ortho cresol and .8 grams of sodium hydroxide in 100 c. c. of water at a temperature between 70° and 80° C.

13. The method of making di-basic lead 3-5 di-nitro ortho cresylate which comprises precipitating said salt by the addition to a solution of 10.5 grams of lead nitrate in 100 c. c. of water of a solution of 1.98 grams of 3-5 di-nitro ortho cresol and 1.2 grams of sodium hydroxide in 100 c. c. of water at a temperature between 80° and 90° C.

WILLI BRÜN.